United States Patent

[11] 3,625,549

| [72] | Inventor | Gerrit De Vries<br>2902 N. Stonehill Drive, Altadena, Calif.<br>91001 |
|---|---|---|
| [21] | Appl. No. | 9,707 |
| [22] | Filed | Feb. 9, 1970 |
| [45] | Patented | Dec. 7, 1971 |

[54] STRAP RING CONNECTOR
6 Claims, 7 Drawing Figs.

[52] U.S. Cl. ................................................... 285/39,
285/93, 285/373, 24/222 SE
[51] Int. Cl. ..................................................... F16l 21/06
[50] Field of Search .......................................... 285/419,
373, 39, 411, 382.4; 24/20, 201 A, 25, 222 SE

[56] References Cited
UNITED STATES PATENTS

| 3,239,254 | 3/1966 | Campbell | 285/419 |
| 3,041,088 | 6/1962 | Brandon | 285/373 X |
| 1,610,165 | 12/1926 | Schellin | 285/382.4 X |
| 2,996,316 | 8/1961 | Terhune | 285/411 X |
| 736,908 | 8/1903 | Wright | 285/39 X |
| 823,591 | 6/1906 | Eager | 285/419 |

FOREIGN PATENTS

| 568,179 | 3/1945 | Great Britain | 285/39 |
| 1,162,063 | 8/1969 | Great Britain | 285/39 |

*Primary Examiner*—Thomas F. Callaghan
*Attorneys*—Richard S. Sciascia and Ervin F. Johnston ABSTRACT: A strap ring connector for joining a pair of cylinder ends including: a strap which is capable of forming a ring, the strap, in its ring configuration, having internal and external surfaces; one side of the internal surface of the strap having grooves therealong and the other side of the internal surface having threads so that the grooves and the threads of the strap are capable of mating engagement with corresponding grooves and threads of the respective cylinders; and means for securing the strap in a ring configuration about the cylinder ends.

INVENTOR.
GERRIT DE VRIES
BY
ERVIN F. JOHNSTON
ATTORNEY.

STRAP RING CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In torpedo and rocket construction it is often necessary to join a pair of cylindrical housings. Many demanding factors must be considered in such joint construction, and accordingly this makes it very difficult to provide a connector which will satisfactorily fulfill all of the requirements. Because of the high forces applied to a torpedo or rocket during launch and its travel to the destination the joint between cylindrical bodies must be unusually strong. The joint must be as rigid as possible. The joint must be capable of withstanding tension (the pulling apart of the two cylindrical bodies), bending, compression, torsion, and shear. Other critical factors involved in the construction of torpedoes and rockets are size and weight. Since it is highly desirable to minimize the propulsion requirements of either of these vehicles it is necessary to minimize the size and weight of any joint construction. Still another consideration is the smoothness of the joint. Since both vehicles rapidly travel through a fluid medium the joint construction must be as smooth as possible so as to minimize drag. Many times the cylindrical bodies of torpedoes or rockets are assembled or disassembled in the field. Both vehicles must be assembled with their cylindrical bodies in perfect rotational alignment. Accordingly, it is necessary that the connector for the cylindrical bodies enable field personnel to quickly and easily assemble and disassemble the cylindrical bodies in a proper manner. In regard to torpedoes it is necessary that the joint construction withstand hydraulic pressure.

SUMMARY OF THE INVENTION

The present invention is an unusual connector which meets all of the desirable features set forth hereinabove. The connector will draw two cylindrical bodies into tight rigid engagement so that all strength requirements are met. The size and weight of the connector is surprisingly less than previously known connectors. Cylindrical bodies can easily be assembled and disassembled with the bodies in perfect rotational alignment. The connector enables the joint to be constructed so that the connector is flush with the exterior cylindrical surfaces so as to provide the desired smoothness to lessen drag on the vehicles. Further, the connector enables an O-ring to be easily used to withstand hydraulic pressure when in a water environment. While the connector is especially adaptable for connecting cylindrical bodies of a torpedo or rocket it is also very useful in connecting any pair of cylindrical bodies. In a preferred embodiment the invention includes: a strap which is capable of forming a ring and which has internal and external surfaces; one side of the internal surface of the strap having grooves therealong and the other side of the internal surface having threads so that the grooves and the threads of the strap are capable of mating engagement with corresponding grooves and threads of the respective cylinders; and means for securing the strap in a ring configuration about the cylinder ends. It is to be understood, however, that in a broad embodiment of the invention the strap could be exteriorly grooved and threaded for joining cylinder ends which are interiorly grooved and threaded.

STATEMENT OF OBJECTS OF THE INVENTION

An object of the present invention is to provide a connector for connecting cylindrical bodies and which provides a joint which is strong, a minimum in size and weight, flush with the cylindrical bodies, and easy to assembly and disassemble.

Another object is to provide a connector which enables an extremely high-strength joint of minimum size and weight, flush with the exterior surface of the joined bodies, and which is easy to assemble and disassemble.

Other objects and many of the attendant advantages of this invention will be readily appreciated as it becomes better understood by reference to the description and accompanying drawings which follow.

BRIEF DESCRIPTION OF THE DRAWINGS

FIG. 3 is an edge view of a portion of the connector where the two ends of the connector come together;

DESCRIPTION OF THE PREFERRED EMBODIMENTS

Figure 1:
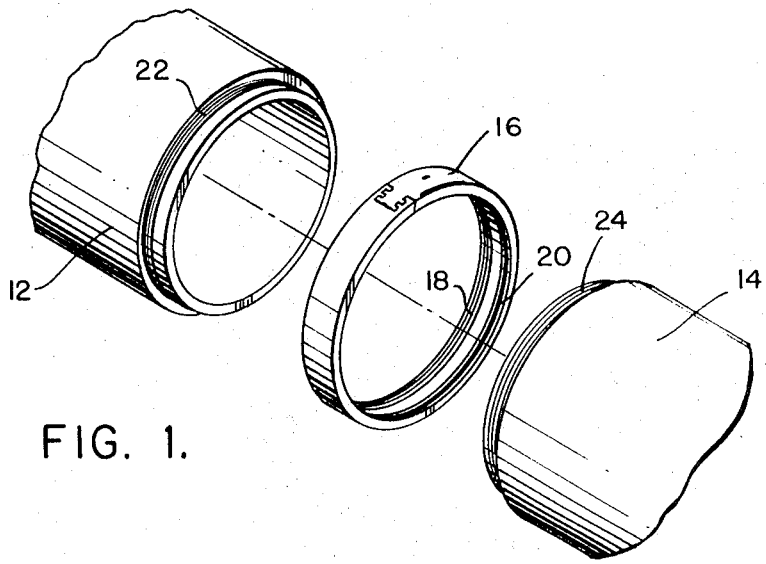
FIG. 1 is an exploded isometric view of a pair of cylindrical bodies with the connector shown therebetween.
Figure 3:
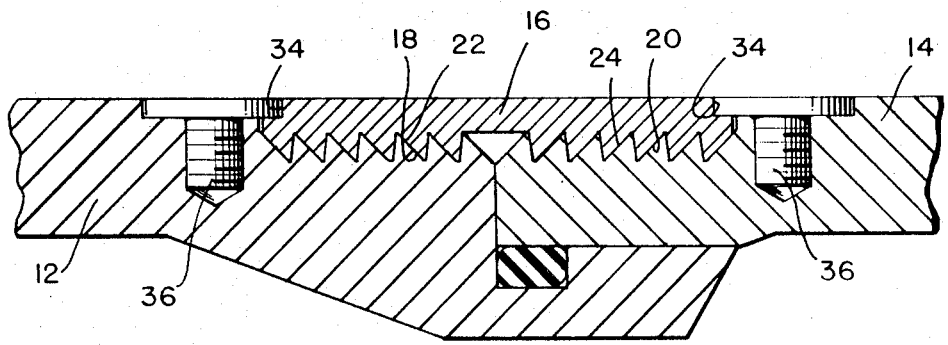
FIG. 3 is a cross-sectional view taken along plane III—III of FIG. 2.

Referring now to the drawings wherein like reference numerals designate like or similar parts throughout the views there is shown in FIG. 1 a pair of cylindrical bodies, such as torpedo housing sections 12 and 14 which may be joined together by the connector 16. The connector 16 may be a strap which is capable of forming a ring and which has internal and external surfaces. As shown in FIG. 3 the internal surface of the strap may have cuts 18 and 20 which are capable of mating engagement with corresponding cuts 22 and 24 on the external surfaces of the torpedo bodies 12 and 14 respectively. The cuts 22 and 24 in the torpedo bodies may be located in slightly recessed sections of the bodies (equal to the thickness of the strap 16) so that upon assembly the external surfaces of the strap 16 and the bodies 12 and 14 will be flush with respect to one another.

The cuts 18 in the strap 16 and the cuts 22 in the cylindrical body 12 may be helical threads in one direction while the cuts 20 in the strap 16 and the cuts 24 in the cylindrical body 14 may be helical threads in the opposite direction. In the preferred embodiment, however, it is desirable that one of these sets of cuts be helical threads while the other set are annular grooves. It is immaterial which set of cuts are threads and which set are grooves, however, for purposes of illustration the cuts 18 and 22 will be referred to as helical threads while the cuts 20 and 24 will be referred to as grooves. This very unique arrangement eliminates the necessity of rotational orientation of the strap with the grooved cylindrical end since the grooves do not require such orientation. In order to rotationally orient the threads 18 and 22 marks 25 (see FIG. 2) may be provided on the exterior surfaces of the strap and one of the cylindrical bodies. Further, it is desirable that the grooves 20 and 24, and the threads 18 and 22 all be of the buttress type. This provides for maximum tensile strength of the joint as well as minimizing popup motion of the strap 16 when tensile forces are applied to the bodies 12 and 14.

Figure 2:
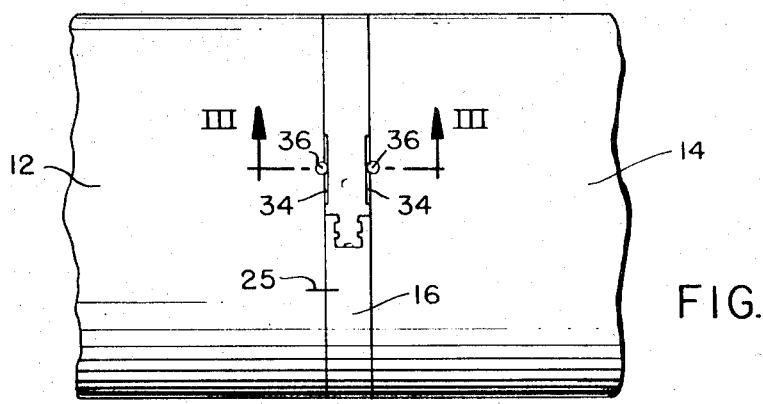
FIG. 2 is a partial view of a pair of cylindrical bodies connected by the connector.
Figure 4:
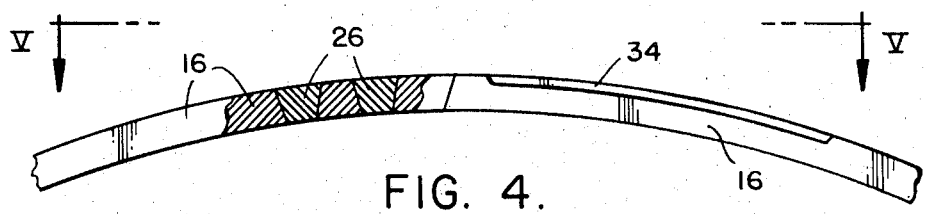
Figure 5:
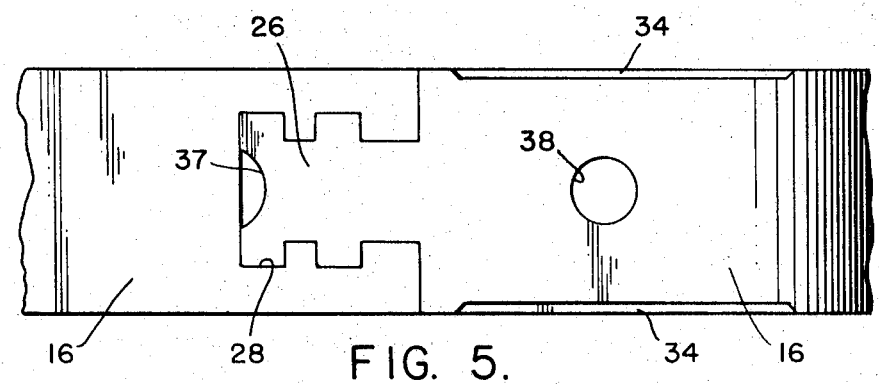
FIG. 5 is a view taken along plane V—V of FIG. 4.
Figure 6:
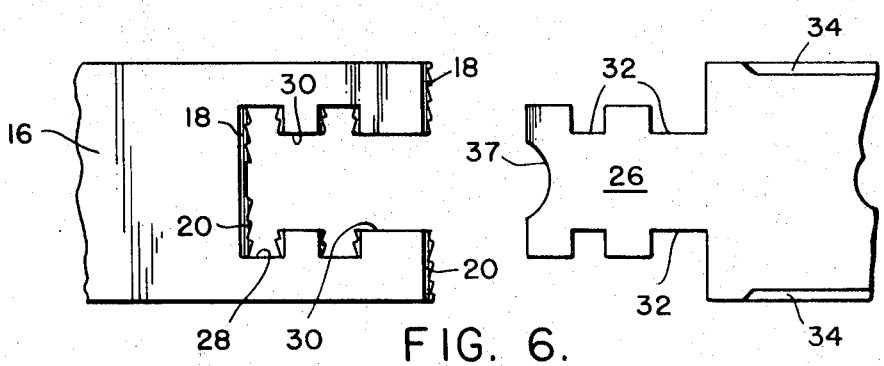
FIG. 6 is an enlarged view of FIG. 5 with the connector ends shown separated.

In a preferred embodiment of the invention a means is provided for securing the strap 16 in a ring configuration about the cylinder. As shown in FIGS. 2, 5 and 6, the securing means may include configuring the ends of the strap 16 for mutual gripping engagement as illustrated in FIGS. 2 and 5. One end of the strap 16 may have a tab 26 and the other end of the strap may have a recess 28 for receiving the tab 26. As illustrated in FIG. 4 it has been found desirable to provide the edges of the tab 26 and the recess 28 with a bevel so that upon assembly the strap ends are flush with respect to one another and one strap end will restrain the other strap end from popping-up motion. While the bevels may be in either direction, FIG. 4 illustrates a beveling so that the tab 26 will hold the other strap end from popping-up motion. If desired the bevels could have been oppositely placed so that the strap end with the recess 28 would go on top of the tab 26 to hold the tab 26 and its strap end from popping-up motion.

Another important consideration is that the strap ends be restrained from longitudinal parting. As shown in FIG. 6, this may be accomplished by providing the recessed end of the strap with transversely inwardly extending projections 30 and the tab 26 with transversely inwardly extending recesses 32 which will receive the corresponding projections. When the strap ends are assembled, as shown in FIG. 5, these projections and recesses will restrain the strap ends from longitudinal parting.

The means for securing the strap ends may further include configuring opposite edges of one end portion of the strap with longitudinal notches 34. As shown in FIGS. 2 and 3 these notches are adapted to receive head portions of bolts 36 which are bolted into corresponding recessed portions within the cylindrical bodies 12 and 14. In this manner the external surfaces of the cylindrical bodies, bolt heads, and strap are flush with one another after assembly. It should be noted that if the beveling is reversed on the tab 26 and the recess 28 that the longitudinal notches 34 would have been provided on the opposite strap end rather than the strap end which has the tab 26.

In the preferred embodiment the strap 16 is constructed of metal and is resiliently biased by spring tempering to its closed ring configuration. In this manner the assembler can quickly and easily insert the tab 26 within the recess 28. In order to provide for quick and easy disassembly of the strap connector 16, the end of the tab 26 has been provided with a cutout 37 which is adapted to receive a tool, such as a screwdriver, for prying the strap ends apart. This cutout may also be beveled to facilitate insertion of the tool. As shown in FIG. 5 a hole 38 may be provided in the strap for the insertion of a tool to rotate the strap about the cylindrical bodies 12 and 14. A screwdriver and hammer may be utilized for this purpose.

Figure 7:
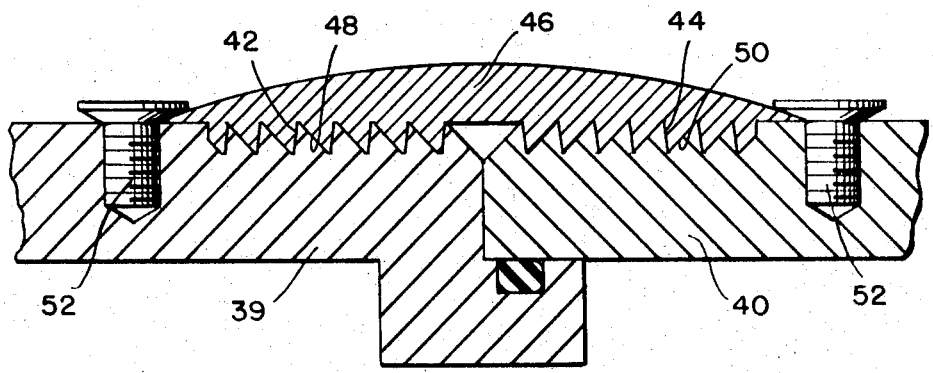
FIG. 7 is illustration of another embodiment of the invention showing a cross section of the connector and the cylindrical bodies.

FIG. 7 illustrates another embodiment of the present invention. In this embodiment the cylindrical bodies 39 and 40 have buttress threads 42 and buttress grooves 44 respectively on their external surfaces. The strap 46 has corresponding internal buttress threads 48 and buttress grooves 50, and may be provided with a generally convex exterior surface. If desired the ends of the strap 46 may be configured in a manner similar to the ends of the strap 16 described hereinabove.

It is to be understood that in a broad embodiment of the invention the strap could be exteriorly grooved and threaded for joining cylinder ends which are interiorly grooved and threaded. Either of the above-described embodiments could be modified according to this arrangement.

In the assembly of the cylindrical bodies 12 and 14 these bodies are first brought together in abutting engagement at their ends with the desired rotational alignment. During this operation the strap 16 may be slightly biased open and located about either cylindrical body 12 or 14. The strap 16 is then parted slightly and brought over both cylindrical ends so that the grooves 20 of the strap mate with the grooves 24 of the cylindrical body 14 and the threads 18 of the strap mate with the threads 22 of the cylindrical body 12. For a proper mating of the threads 18 and 22 the marks 25 (see FIG. 2) are aligned. The tab 26 is then inserted in the recess 28 and the strap 16 is rotated for tightening the threads 18 and 22 so that the ends of the cylindrical bodies 12 and 14 are brought into tight compression with respect to one another. This enables a very rigid joint which provides desirable strength qualities. The longitudinal notches 34 are of sufficient length to insure that the strap has brought about the desired compression between the ends of the cylindrical bodies. The bolts 36 are then screwed into the cylindrical bodies 12 and 14 so that there will be no popping-up motion of the strap 16 when the cylindrical bodies are subjected to various forces.

Obviously many modifications and variations of the present invention are possible in the light of the above teachings. It is therefore to be understood that within the scope of the appended claims the invention may be practiced otherwise than as specifically described.

I claim:

1. A strap ring connector for joining a pair of cylinder ends wherein each cylinder has a length of cuts therearound, comprising:

a strap which is capable of forming a ring and which has internal and external surfaces;

one of the surfaces of the strap having cuts therealong which are capable of mating engagement with the cuts in the cylinder;

means for securing the strap in a ring configuration about the cylinder ends;

the securing means includes:

one end of the strap having a tab and the other end of the strap having a recess for receiving the tab;

the edges of the tab and the recess being beveled so that the strap ends are flush and one strap end will restrain the other strap end from popping-up motion; and the recessed end of the strap having transversely inwardly extending projections on each side thereof and the tab having transversely extending recesses on each side thereof for receiving the projections so that the strap ends are restrained from longitudinal parting.

2. A strap as claimed in claim 1 including:

one end of the strap being longitudinally notched along both edges.

3. A strap as claimed in claim 2 wherein:

the strap is constructed of a material which biases the strap to a closed ring configuration; and the end of the tab has a cutout for prying the strap ends apart with a tool, such as a screwdriver.

4. A strap ring as claimed in claim 2 including: means cooperable with the longitudinal notches for fastening the strap to the cylinder ends.

5. A strap ring connector, as claimed in claim 1, for joining a pair of cylinder ends wherein one cylinder has a length of external grooves and the other cylinder has a length of external threads, wherein:

a portion of the cuts being grooves which are located on one side of the internal surface of the strap and the other cuts being threads which are located on the other side of the internal surface so that the grooves and threads of the strap are capable of mating engagement with the corresponding grooves and threads of the respective cylinders.

6. A strap ring as claimed in claim 5 wherein:

the grooves are buttress grooves and the threads are buttress threads.

* * * * *